United States Patent Office 2,710,277
Patented June 7, 1955

2,710,277

IODINE PHOSPHATE ESTER COMPOSITIONS

Morris V. Shelanski, Atlantic City, N. J., and Murray W. Winicov, Philadelphia, Pa., assignors to West Laboratories, Inc., Long Island City, N. Y., a corporation of New York No Drawing. Application April 23, 1952,
Serial No. 283,982

10 Claims. (Cl. 167—17)

The present invention relates to preparations for controlling microorganisms, particularly bacteria, fungi, molds, etc.

Iodine is recognized as an excellent bactericide. However, it cannot be efficiently used in its free form because of its high vapor pressure resulting in excessive loss of the free iodine when applied to control microorganisms. In view of its poor solubility in water (only 0.0162 parts of iodine dissolve in 100 parts of water at 0° C. and 0.09566 parts of iodine dissolve in 100 parts of water at 60° C.), it cannot be used in the form of an aqueous solution. A solution of iodine in the common water miscible solvents for iodine such as acetone, ethyl alcohol, methyl alcohol, glycols and glycerols, cannot be used effectively to control microorganisms in water because upon addition of such solution to water much of the iodine is precipitated promptly and is lost without exercising its germicidal action. The addition of an iodine solution in a water immiscible solvent such as carbon tetrachloride, benzene and ether to water containing microorganisms does not result in control of the microorganisms because little of the iodine dissolves in the water, the amount thus dissolved being limited by the solubility of iodine in water which as above noted is very small.

It is among the objects of this invention to provide a preparation for the control of microorganisms which incorporates as the main germicidal agent iodine in substantial amount far above the solubility of iodine in water and which preparation upon addition to water releases the iodine gradually so that it is effective to control microorganisms.

We have found that iodine combines with certain phosphate esters identified below to produce iodine solutions or complexes which are soluble in water to produce iodine containing solutions in which the iodine is released gradually so that it is effective to control microorganisms. The iodine solution or complex may be dissolved in water to produce an iodine containing solution having a concentration as high as 30% by weight of iodine. Solutions of any desired iodine concentration may thus be produced, for example, within the range of from 0.1% to 30% by weight of iodine. This is indeed surprising, because neither phosphoric acid nor its salts have any tendency to solubilize iodine in aqueous media. This is also true of alkyl phosphates (RPO(OH)$_2$ in which R is alkyl), their sodium salts, dialkyl phosphates and dialkyl phosphites. We have discovered, however, that the phosphate esters identified below have the property of forming iodine solutions or complexes which are soluble in aqueous media, i. e., solubilize iodine in aqueous media.

The phosphate esters employed in accordance with this invention have the following formula:

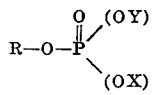

in which R is an alkyl group containing from 1 to 20, preferably 2 to 12, carbon atoms, phenyl, naphthyl or an alkylaryl group in which the alkyl substituent contains from 1 to 20, preferably 2 to 12, carbon atoms and the aryl substituent is phenyl or naphthyl and X and Y are solubilizing groups such as (a) ω hydroxyalkyl radical, the alkyl group of which contains from 1 to 5 carbon atoms, for example, hydroxyethyl or hydroxypropyl, (b) polyethylene oxide group containing from 2 to 40, preferably 2 to 20, mols of ethylene oxide per mol of the phosphate ester, (c) polypropylene oxide group containing from 2 to 40, preferably 2 to 20, mols of propylene oxide per mol of phosphate ester, (d) mixed ethylene oxide propylene oxide polymers containing from 1 to 20 mols of ethylene oxide and 1 to 20 mols of propylene oxide per mol of the phosphate ester, and (e) an amide derivative having the formula NR'R" in which R' is an alkyl group containing from 1 to 10, preferably 1 to 5, carbon atoms and R" is hydrogen or an alkyl group containing from 1 to 10, preferably from 1 to 5, carbon atoms. X and Y may be the same or different.

Examples of such compounds are:

(1) Dodecyl di-hydroxyethyl phosphate which has the formula:

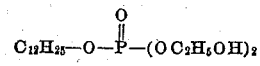

(2) Cetyl, N,N' di-diethylphosphamide which has the formula:

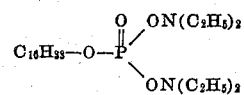

(3) Dodecyl di-polyoxyethylene phosphate which has the formula:

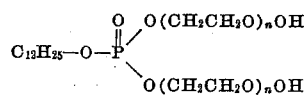

n having a value of from 2 to 40.

(4) The alkyl phosphate esters have a molecular weight about 500, a melting point below 0° C., a specific gravity of 1.12 at 25° C. which is a neutral yellow liquid, soluble in water and sold under the trade name Victawet 14 by the Victor Chemical Works.

The phosphate ester and iodine may be mixed at room temperature or any temperature at which the constituents and resultant mixture are stable, i. e., do not decompose. From 0.1% to 12% iodine, preferably from 1% to 8%, by weight based on the weight of the phosphate ester are mixed. The resultant mixture is either liquid or solid depending upon the phosphate ester used. When it is desired to use this preparation, it is added to an aqueous medium, e. g., water, forming a solution of any desired iodine concentration, say from 0.1% to a high as 30% by weight of iodine at room temperature (20° C.). When this solution is applied to control microorganisms it releases the iodine gradually so that it is effective to react with and destroy the microorganisms.

The following examples illustrate preparations embodying this invention. It will be understood the invention is not limited to these examples. In these examples all parts are by weight.

Example I 7.8 parts of iodine
92.2 parts of Victawet 14

Example II 8 parts of iodine
92 parts of dodecyl di-hydroxyethyl phosphate

Example III 2 parts of iodine
98 parts of cetyl N,N'di-diethyl phosphamide

Each of the above examples when added to an aqueous medium produces a solution containing any desired concentration of iodine depending upon the amount of the preparation dissolved or dispersed in the aqueous medium. This solution or dispersion when applied to control microorganisms gradually releases iodine which is effective to combat the microorganisms.

The solutions thus produced may be employed to combat microorganisms domestically and industrially, particularly the latter. For example, such solutions may be applied to paper in the course of its manufacture to control mold and fungi. It may be used for cleaning surfaces to insure sanitary conditions, e. g., for the cleaning of floors, walls, sinks, bowls and other surfaces, as a rinse for dishes and kitchen utensils, as a germicidal composition, a constituent of soaps, etc. Such soaps may contain from 10 to 97 parts by weight of soap stock, e. g., saponified fatty acids, from 2 to 50 parts of the phosphate ester and from 1 to 10 parts of iodine. The soaps may contain other constituents such as polyethylene glycol of a molecular weight about 6000 when a solid soap product is desired, pigments or dyestuffs, perfuming agents and fillers.

As many changes could be made in the above preparation and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. A preparation for the control of microorganisms consisting essentially of iodine and a phosphate ester, the latter in major proportion by weight and having the formula

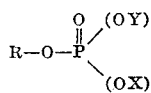

in which R is from the group consisting of alkyl groups containing from 1 to 20 carbon atoms, phenyl, naphthyl and alkylaryl groups in which the alkyl substituent contains from 1 to 20 carbon atoms and the aryl substituent is from the group consisting of phenyl and naphthyl and X and Y are solubilizing groups from the group consisting of ω hydroxy alkyl radical, the alkyl group of which contains from 1 to 5 carbon atoms, polyethylene oxide groups containing from 2 to 40 mols of ethylene oxide per mol of phosphate ester, polypropylene oxide groups containing from 2 to 40 mols propylene oxide per mol of phosphate ester, mixed ethylene oxide propylene oxide polymers containing from 1 to 20 mols of ethylene oxide and 1 to 20 mols of propylene oxide per mol of the phosphate ester and amide derivatives having the formula NR'R" in which R' is an alkyl group containing from 1 to 10 carbon atoms and R" is from the group consisting of hydrogen and an alkyl group containing from 1 to 10 carbon atoms.

2. The preparation called for by claim 1, in which from 0.1% to 12% iodine based on the weight of the phosphate ester is mixed with the phosphate ester.

3. A preparation for the control of microorganisms consisting essentially of iodine and dodecyl di-hydroxyethyl phosphate.

4. The parparation called for by claim 3, in which from 0.1% to 12% iodine by weight based on the weight of the phosphate ester is mixed with the phosphate ester.

5. A preparation for the control of microorganisms consisting essentially of iodine and cetyl, N,N' di-diethyl-phosphamide.

6. The preparation called for by claim 5, in which from 0.1% to 12% iodine by weight based on the weight of the phosphate ester is mixed therewith.

7. A preparation for the control of microorganisms consisting essentially of iodine and dodecyl di-polyoxyethylene phosphate in which from 2 to 40 mols of ethylene oxide are condensed per mol of phosphate ester.

8. The preparation called for by claim 7, in which from 0.1% to 12% iodine by weight based on the weight of the phosphate ester is mixed therewith.

9. A preparation for the control of microorganisms consisting essentially of iodine and an alkyl phosphate ester, the latter in major proportion by weight and having a molecular weight about 500, a melting point below 0° C. and a specific gravity of 1.12 at 25° C.

10. The preparation set forth in claim 9, in which from 0.1% to 12% iodine by weight based on the weight of the phosphate ester is mixed therewith.

References Cited in the file of this patent

UNITED STATES PATENTS

| Number | Name | Date |
|---|---|---|
| 2,143,639 | Caprio | Jan. 10, 1939 |
| 2,550,622 | Taub | Apr. 24, 1952 |